April 30, 1935.  M. MALLORY  1,999,333
IGNITION TIMING DEVICE
Filed Sept. 6, 1932
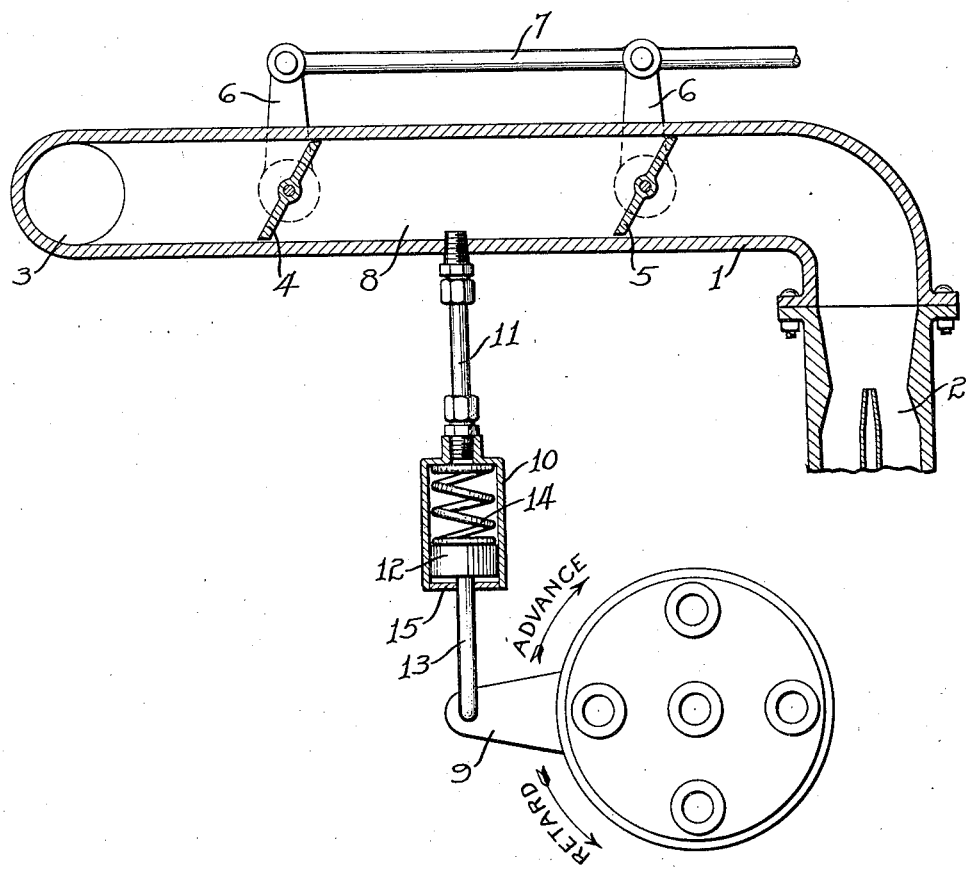
Inventor
Marion Mallory
By Owen & Owen
Attorneys Patented Apr. 30, 1935

1,999,333

UNITED STATES PATENT OFFICE 1,999,333

IGNITION TIMING DEVICE

Marion Mallory, Detroit, Mich., assignor to The Mallory Research Company, Toledo, Ohio, a corporation of Delaware Application September 6, 1932, Serial No. 631,867

5 Claims. (Cl. 123—117)

The object of this invention is to provide a practical ignition timing device for internal combustion engines in which the advance or retardation of the spark is controlled by suction from the intake manifold. Automatic timing of the spark by a speed controlled governor is not as efficient as could be desired, because it makes no provision for regulating the timing with reference to the load on the engine.

Direct pneumatic control of the timing from the intake manifold, as heretofore proposed, has also been unsatisfactory. One objection to previous constructions is that, if the control member is arranged so that a partial vacuum to the manifold advances the spark in proper relation to an increase in speed, or a decrease in load, with the throttle valve wide open or partially open, there will also be a sufficient vacuum formed in the manifold to cause an undue advance of the spark when the engine is idling with the throttle nearly closed.

This invention, therefore, provides a construction by which the spark advance is pneumatically controlled from a chamber which has a free communication with the intake manifold when the throttle valve is open, but has insufficient communication therewith to cause an advance of the spark when the throttle valve is in idling position. In the preferred form of the invention, there are two throttle valves in series in the intake passageway, and the spark control device is connected to the passageway between the two valves. This effectively prevents the spark from being advanced when the throttle valve is nearly closed and also tends to prevent any irregularity in the spark advance as a result of the pulsations of the engine.

The invention will be more specifically described in connection with the accompanying drawing, which is a diagrammatic illustration of the connections between the intake manifold, the carburetor, the timer and the throttle valve.

In accordance with the present invention, the fuel intake passageway 1, which leads from the Venturi 2 to the intake manifold 3, is of sufficient length to receive two similar throttle valves 4 and 5, each of which is provided with an arm 6 pivotally connected to the throttle control rod 7. The valves 4 and 5 are spaced from each other, leaving between them a chamber 8 from which the position of the timer 9 is pneumatically controlled.

The control means for the timer comprises a cylinder 10, one end of which is in communication with the chamber 8 through a pipe 11. The other end of the cylinder contains a piston 12 which has a stem 13 connected with the timer 9.

A spring 14 within the cylinder 10 urges the piston 12 toward the head 15 of the cylinder to hold the timer in spark retarded position. Upon the occurrence of a sufficient degree of vacuum in the chamber 8, however, the piston 12 will be drawn away from the head 15 in opposition to the spring 14 to advance the spark.

In the operation of the invention, it will be understood that the two valves 4 and 5 are actuated simultaneously and both are open substantially to the same extent. When these throttle valves are open to a considerable extent, as they will be when the motor is running under normal load, there will be little difference in pressure between the intake manifold 3 and the chamber 8. As the speed increases sufficiently to cause a predetermined degree of vacuum in the chamber 8, the spark will be advanced. As the load increases, causing an increase in compression and a diminution of the vacuum in the intake manifold, the spark will be retarded.

When the throttle valve is in idling position, there will be developed a considerable degree of vacuum in the manifold 3, but as the fuel mixture is drawn from the chamber 8 into the intake manifold, it is substantially replaced by a similar amount of the fuel mixture from the mixing chamber, past the valve 5. There will not, therefore, be sufficient vacuum developed under these conditions in the chamber 8 to advance the spark. As the throttle valves are opened, however, the degree of vacuum in the chamber 8 approaches more and more closely to that in the intake manifold until, under normal operating conditions, the spark will be advanced in accordance with the speed and load in a manner to insure approximately the utmost efficiency in the operation of the engine. When the throttle valve is suddenly opened, the spark will not be advanced until there is a sufficient increase in the operating speed. When the throttle valve opening is decreased so that there is no longer a free communication between the chamber 8 and the intake manifold, the spark will be at once retarded. Thus, the timing is controlled entirely by vacuum through the connection 11, according to the load, as well as the speed of operation.

It is apparent that the construction of the invention may be considerably modified without departing from the scope of the appended claims, the essential feature being the control of the communication between the timer connection and the intake manifold in accordance with the position of the throttle valve.

What I claim is:—

1. In an internal combustion engine, the combination of a timer, a fuel intake passageway, two throttle valves spaced apart in series in said passageway, means for causing a simultaneous and similar movement of both valves, and a suction controlled means for varying the position of the timer, said last mentioned means being connected with said passageway between the two throttle valves.

2. The combination with the intake manifold, timer and a throttle valve of an internal combustion engine, of a suction chamber connected to the intake manifold between said throttle valve and the engine, means movable by a predetermined suction in said chamber to advance the timer, said chamber being in free communication with the intake manifold when the throttle valve is open, and means for cutting off said communication to substantially the same extent that the throttle is closed.

3. The combination with the intake manifold of an internal combustion engine, a fuel passageway leading to said manifold, a throttle valve in said passageway, and an ignition timer, of a suction chamber having free communication with said passageway between said valve and the manifold, means movable by a predetermined suction in said chamber to advance the timer, said chamber having free communication with the passageway when the throttle valve is open, and manifold when the throttle valve is open, and means for substantially closing communication between said passageway and the manifold when the throttle valve is in idling position.

4. The combination with the intake manifold of an internal combustion engine, a fuel passageway leading to said manifold, and an ignition timer, of two throttle valves spaced apart in series in said passageway and movable in unison either to an open or an idling position, a cylinder in communication with said passageway between the two valves, and a piston operable by suction in said cylinder to advance the timer.

5. The combination with the intake manifold, the timer and a throttle valve of an internal combustion engine, of suction operable means connected to the intake manifold between said throttle valve and the motor to advance the timer, and means operable in unison with said throttle valve to open communication between said first mentioned means and the manifold to substantially the same extent that said throttle valve is opened.

MARION MALLORY.